Dec. 13, 1960 M. KRAMCSAK, JR., ET AL 2,963,732
CASTER HAVING A COMPENSATOR CLIP
Filed Sept. 9, 1958 2 Sheets-Sheet 1

INVENTORS
MICHAEL KRAMCSAK, JR.
ROBERT E. SHEAHAN
By *Q.F. Douras*
ATTORNEY

Dec. 13, 1960   M. KRAMCSAK, JR., ET AL   2,963,732
CASTER HAVING A COMPENSATOR CLIP
Filed Sept. 9, 1958   2 Sheets-Sheet 2

INVENTORS
MICHAEL KRAMCSAK, JR.
ROBERT E. SHEAHAN
BY A. T. Douras
ATTORNEY

United States Patent Office 2,963,732
Patented Dec. 13, 1960

2,963,732
CASTER HAVING A COMPENSATOR CLIP

Michael Kramcsak, Jr., Bridgeport, and Robert E. Sheahan, Woodbridge, Conn., assignors to The Bassick Company, Bridgeport, Conn., a corporation of Connecticut Filed Sept. 9, 1958, Ser. No. 760,015

8 Claims. (Cl. 16—21)

This invention relates to swivel-type caster structures and more particularly to the use of a detachable spring wire compensator clip that may be readily attached to such casters to eliminate the shimmy normally associated with the caster bearings.

Small hand trucks are in universal use today for transporting articles over relatively short distances. Such hand trucks normally incorporate fixed casters at the rear of the truck while being provided with casters of the swivel type at the forward end. While the use of swivel casters allows the operator to more easily maneuver the hand truck, there is a tendency for the swivel bearings to shimmy or wobble as the truck is being propelled, depending upon the load involved and the relative smoothness of the surface over which the truck travels. In addition, the relative looseness or play associated with the swivel bearings, especially when the truck is unloaded, often causes an objectionable amount of noise when moving the unloaded truck over a comparatively smooth floor and is most objectionable when propelling the truck along a particularly rough floor. In addition, the wobbling or shimmying makes the vehicle hard to control which leads to trouble in steering, particularly when turning corners. A failure of the swivel caster wheel to follow the desired course may occur resulting in a sliding or dragging movement of the caster wheel on the floor surface.

It is therefore an object of the present invention to provide an improved swivel type caster structure which will eliminate the free play or slop in conventional caster swivel bearings and greatly reduce any noise that is associated with such looseness.

It is a further object of this invention to provide an improved swivel type caster structure which eliminates the shimmy normally present in such constructions.

It is a further object of this invention to provide an improved swivel type caster structure which when applied to a hand truck or like vehicle will allow the hand truck to be more easily steered and readily controlled.

Further objects and advantages of this invention will be pointed out in the following description and claims and illustrated in the accompanying drawings, which disclose by way of example, the principle of the invention and the best mode which has been contemplated of applying that principle.

Figure 2:
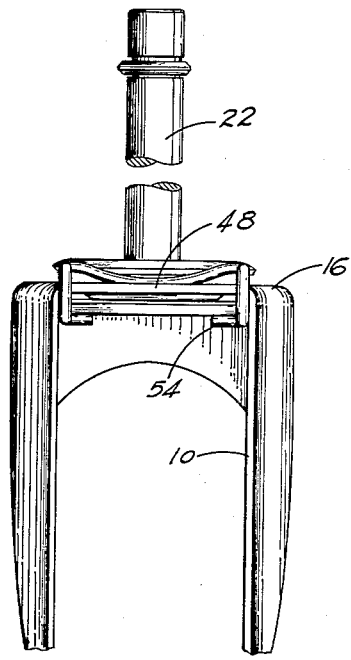
Figure 2 is a front view of the embodiment shown in Figure 1.
Figure 1:
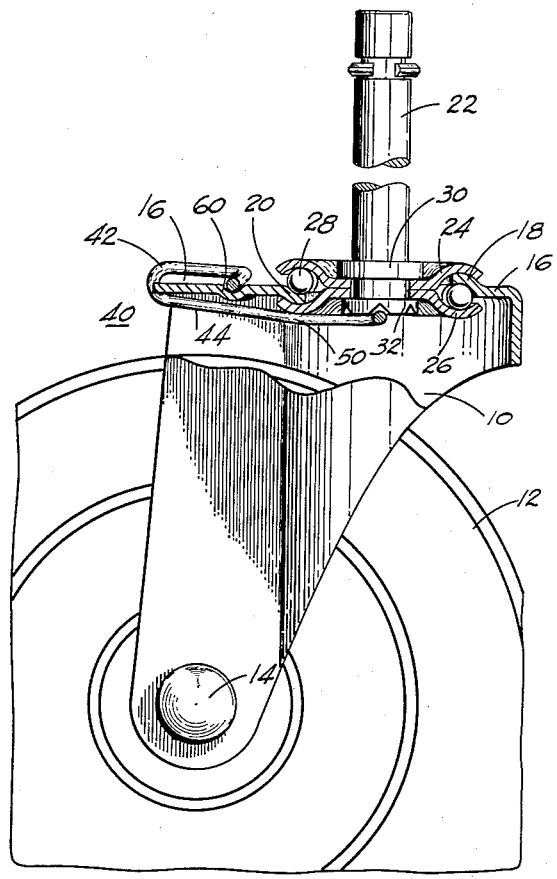
Figure 1 is a side elevation view, partially in section, of a caster structure including a two-level ball bearing race, employing one embodiment of this invention.

Referring now to the drawings, there is shown in Figures 1 through 7 one embodiment of this invention. In the embodiment shown in Figure 1, the compensator clip of the present invention is adapted to be used with a caster structure including a swivel thrust bearing having a two-level ball bearing race which is particularly adapted for eccentric loading and is the subject of Patent 1,914,204—Walter F. Herold and Emil E. Knittel—June 13, 1933. This construction is best seen in Figure 1, which shows a caster including a conventional horn 10 of sheet metal having a wheel 12 disposed therein and mounted upon axis 14 for rotation between the side portions of the horn 10. The horn 10 further includes a generally flattened top portion 16 having a pair of segmental flanges 18 and 20 which cooperate to form an annular opening or aperture within the top portion. A conventional spindle 22 is disposed along a vertical axis within the opening formed by the two segmental flanges 18 and 20 and has rigidly attached thereto, a pair of annular members 24 and 26 which cooperate with the segmental flanges 18 and 20 to form bearing races for the generally circular series of ball bearings 28. In order to rigidly secure the annular members 24 and 26 together and to prevent any axial movement between the spindle and its associated members with respect to the horn, there is further provided a washer 30 which is rigidly secured to the spindle 22 and is adapted to hold the annular members 24 and 26 against the head 32 of the spindle. For a detailed explanation of the operation of the two-level ball bearing and its particular adaptability to eccentric loading, reference may be had to the aforementioned United States Patent 1,914,204. However, it is important to note that because of the increased number of parts required to effect an improved bearing for eccentric loading, there is an increased tendency for the swivel thrust bearing of this type to chatter or shimmy, particularly when lightly loaded. In addition, there is an increase in free play or slop in such caster swivel bearings and are thus objectionably noisy when lightly loaded.

Figure 5:
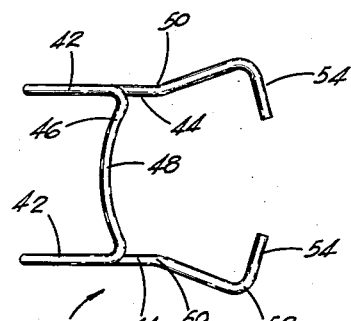
Figure 5 is a top view of the compensator clip embodying one form of this invention.
Figure 6:
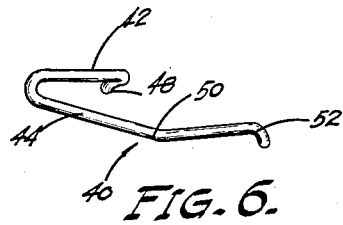
Figure 6 is a side view of the clip shown in Figure 5.
Figure 7:
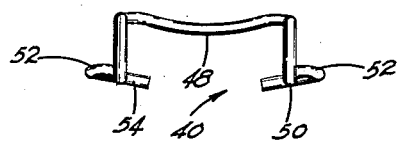
Figure 7 is a front view of the clip shown in Figure 5.

The present invention is directed to the use of a formed, resilient, wire compensator clip that may be readily and detachably mounted on conventional swivel casters to take out the excessive free play and slop of such structures as well as to eliminate the associated shimmy when such casters roll along a particularly rough floor. Reference may be had to Figures 5, 6 and 7 which show in detail the compensator spring clip 40 of the present invention. Figure 6 shows a side view of the clip 40 which is constructed of piano wire or the like and is formed so as to provide compressive spring forces in desired directions at the necessary points along the caster structure. As such, the single element compensator spring clip 40 includes a pair of spaced, generally parallel arm portions 42 and 44, in horizontally spaced planes which are bent into a narrow U shape for slidably embracing the caster structure. A somewhat curved crossarm portion 46 extends laterally between the two inner ends of the upper arm portions 42 and has its central portion bent downwardly at 48. The exact length of the cross arm portion will vary with the size of the caster but is of such a length that the arm portions will contact the inner surfaces of the side portions of horn 10. The bottom arm portions 44 intermediate their ends are directed outwardly and slightly upwardly as indicated at 50 and extend away from each other from this point. The lower arm portions 44 are further directed downwardly and inwardly to form end portions 54. As indicated in Figure 5, the angle formed at 52, between the end portions 54 and the main arm portions 44 when viewed from above, is approximately 90°.

Figure 3:
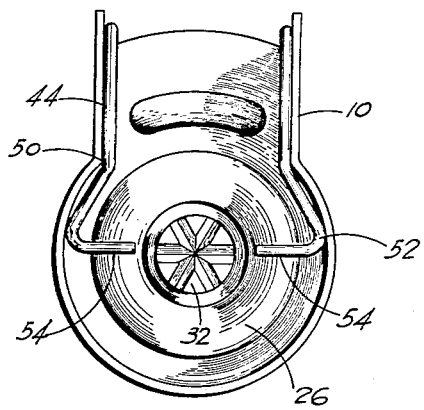
Figure 3 is a bottom view of the structure shown in Figure 1.
Figure 4:
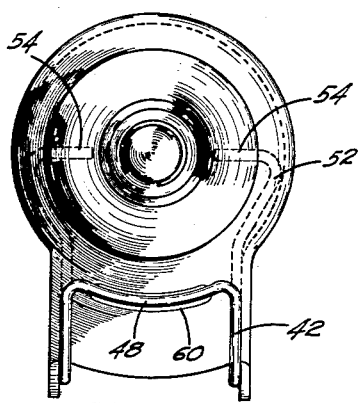
Figure 4 is a top view of the embodiment shown in Figure 1.

Referring now to Figures 1 through 4, it can be seen in detail how the compensator clip 40 is slidably mounted upon the caster so that it may resiliently hold the parts together and prevent shimmy, etc., while at the same time offering a relatively easy mounting arrangement whereby the clip may be readily detached if desired. The compensator clip 40 is positioned at the front of the caster horn so that the generally downwardly directed cross arm portion 48 of the clip contacts the upper surface of the flattened top portion 16 of horn 10. In this regard, the bottom arm portions 44 slide underneath the flattened surface 16 of horn 10 with the portions of the clip 52 being moved together relative to each other in order that the clip may be inserted within the sides of horn 10 as best indicated in Figure 3. If desired, in order to more securely position the compensator clip upon the caster structure, a depression 60 is provided upon the upper surface of the flattened portion 16 of horn 10 as indicated in Figure 1. This depression may be easily formed within the upper surface of the horn by any conventional manner, but the length and width of the depression should be of a size which will easily accommodate the downwardly directed portion 48 of compensating spring clip 40. The formation of the angle at 50 upon the lower arm portion 44 of the clip member produces a cantilever effect so that the upper and lower arm portions have a tendency to move together under compressive spring forces set up within the arms. This cantilever effect is produced when the spring clip member is slightly deformed as it is slid over the upper surface 16 of the horn 10. The lower compressive spring force is applied to the bottom race at the point where the lower spring clip arm portions 44 terminate. As indicated in Figure 3, the cantilever effect of the lower arm portion 44 produces a frictional contact at end portion 54 against the lower surface of ball bearing race 26 at this point. In addition, since the lower arm portions 44 are directed outwardly at 50, there is a tendency for the bottom arm portions 44 of the clip to move outwardly against the inner surface of the horn 10. This aids in securely locking the bottom of the clip against the caster structure as well as additionally restraining any relative movement between the horn 10 and the lower bearing race. Since the lower arm portions 44 terminate in end portions 54 which are directed generally downward, there will be a tendency for the lower arm portions 44 to twist slightly as the spring clip is positioned upon the caster. This, in effect, causes a torsional force to be exerted upon the bottom surface of the caster structure, that is, against the bottom race 26, and this torsional force is translated entirely through the clip member. Thus, there is both a compressive force and a torsional force exerted upon the swivel bearing portion of the caster and the net effect of these forces and the frictional contact that is developed, is to take out all of the free play or slop normally associated with such caster swivel bearings, as well as to eliminate caster swivel bearing shimmy and to greatly reduce the noise associated with such looseness.

It should be noted that the spring compensator clip of the present invention includes force-exerting members associated with each side of the bearing structure. This allows a greatly increased distribution of the spring forces normally required to prevent chatter and shimmy of the associated bearing parts. This improvement can be more readily appreciated when consideration is given to the points where the compressive forces are exerted. For instance, the upwardly directed frictional forces exerted upon the bottom of the caster structure are at points on either side of the lower annular ball bearing race member 26 where the clip ends 54 contact the race, best indicated in Figure 3. In like respect, a downwardly exerted compressive force is exerted along the depression 60 which is formed in the upper surface 16 of horn 10. This triangular distribution of spring forces may be best seen in Figure 4 which shows the two contact areas 54 at the bottom of the caster construction and a single upper point of frictional contact 48 which lies within depression 60.

At the same time, there is exerted a sufficient compressive force and frictional contact on the rotatable caster members to resist any relative rotation of the spindle with respect to the horn. As such, the caster will swivel only when subjected to a minimum force and the resistance set up by the spring clip is great enough to prevent wobble during movement over rough surfaces, particularly without a load, when the caster is most subject to wobble and shimmy.

Figure 8:
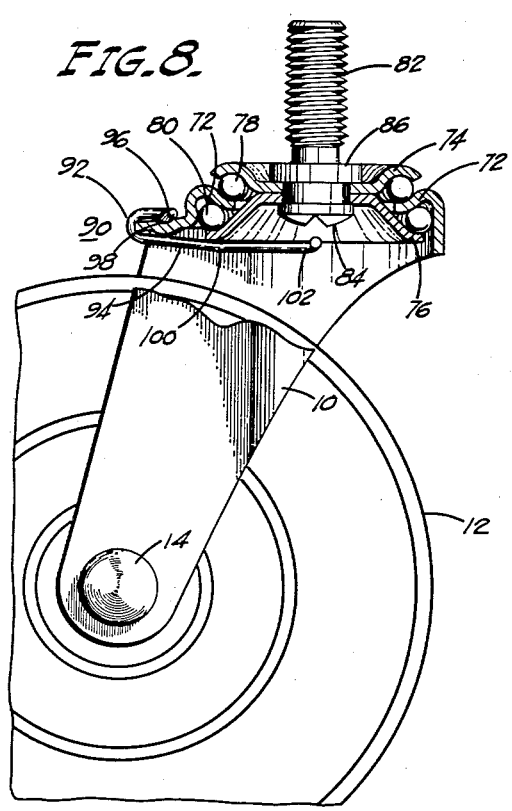
Figure 8 is a side elevation view, partially in section, of a caster structure including a double race ball bearing employing one embodiment of this invention.

While the present invention is particularly adaptable for caster structures of the type shown in Patent 1,914,204, wherein a single set of balls are arranged to travel in a two-level race and the balls move from one level to the other to take their positions on opposite sides of the eccentrically loaded member, the compensator spring wire clip may be utilized in other caster structures such as those employing a single conventional ball bearing, or a double race ball bearing arrangement such as that shown in Figure 8. In this figure, there is provided a conventional horn 10 which likewise includes a wheel mounted within the horn for rotation on axis 14 in a manner similar to that of Figure 1. The horn 10 includes in its flattened top surface an opening which is surrounded by a circular flange 72 forming one of the ball bearing races. On either side of this annular flange 72 there are provided a pair of annular members 74 and 76 which define extreme upper and lower ball bearing races within which are located, in parallel planes, an upper continuous circular series of ball bearing members 78 and a lower series of ball bearing members 80. There is further provided within the opening formed in the upper portion of the horn, a conventional spindle 82 which is rigidly coupled by means of washer 86 to the upper and lower annular race members 74 and 76 in a manner similar to the embodiment shown in Figure 1. Thus, during operation, the spindle and its associated annular members 74 and 76 will rotate relative to the horn 10 on the two series of ball bearings 78 and 80. In this conventional double ball bearing swivel structure, there will also be a certain amount of slop or free play between the rotatable members with resultant shimmying. The compensator clip 90 of the present invention is adapted to slidably engage the caster structure in a manner similar to the embodiment shown in Figure 1 to eliminate the free play and resultant shimmy. The clip member 90 is almost identical in configuration to the clip member 40 shown in Figures 5, 6, and 7. The clip member includes a pair of upper and lower arm portions 92 and 94, respectively, in horizontal spaced planes, the upper arm portions 92 being joined by a cross arm portion 96 which is adapted to be positioned within a suitable depression 98 located upon the upper surface of the flattened top portion of the horn 10. This cross arm portion 96, therefore, exerts a downward compressive force upon the horn at this point. The lower arm portions 94 of the compensator clip 90 are bent upwardly intermediate their ends at 100 to produce a cantilever effect similar to that of compensator clip 40. In addition, the bottom arm portions 94 at this point 100 are directed outwardly so that they may contact the inner wall surface of the caster horn 10 to aid in securing the clip firmly in place after the clip has been slidably mounted upon the caster structure. In like manner to the compensator clip 40, each of the lower arm portions 94 of clip 90 terminate in inwardly directed end portions 102 which form the bottom, compressive, frictional force-engaging portions of the clip member and each lower arm portion 94 contacts the bottom surface of the lower ball bearing race member 76. While the compensator clip shown in Figure 8 is partially in section and therefore only shows one of the pairs of upper and lower arm portions, the clip itself is similar to that shown in Figures 5, 6, and 7 and includes lower arm portions contacting either side of the lower ball bearing race 76.

While there is shown in the drawings a single element resilient wire compensator clip, the present invention is intended to cover any modifications including those having a plurality of joined elements which employ three-point frictional contact.

While there has been shown and described and pointed out the fundamental novel features of the invention as applied to the preferred embodiments, it will be understood that various omissions and substitutions and changes in the form and details of the device illustrated in its operation may be made by those skilled in the art without departing from the spirit of the invention. It is the invention, therefore, to be limited only as indicated by the scope of the following claims.

What is claimed is:

1. A swivel-type caster comprising; a horn, including an upper flattened top portion and a pair of spaced generally parallel side portions, a wheel mounted within said side portions for rotation therein, a mounting spindle passing through said top portion and rotatably connected thereto by an antifriction bearing including upper and lower annular bearing race members, a generally U-shaped, resilient, single-wire clip including a pair of upper arm portions and a pair of lower arm portions in horizontal spaced planes, said upper arm portions being joined at their inner ends by a laterally extending crossarm portion, said crossarm portion adapted to contact the upper surface of said top portion adjacent said spindle and to exert a downward compressive force on said horn, said lower arm portions terminating in end portions directed inwardly toward each other, said end portions adapted to contact the bottom surface of said lower annular bearing race member and to exert an upwardly directed compressive force on said annular member whereby said clip eliminates free play and shimmy within said caster bearing and reduces associated bearing noise.

2. A swivel-type caster as claimed in claim 1 wherein the inner end portions of said lower arm portions of said clip are directed downwardly away from said crossarm portion of said clip whereby torsional forces are set up within said clip member when said clip is positioned on said caster.

3. A swivel-type caster as claimed in claim 1 further including a depression located within said upper surface of said horn, and said crossarm portion of said clip being bent inwardly and downwardly at the center thereof, whereby the center of said crossarm portion is positioned within said depression when said clip is positioned on said caster.

4. A swivel-type caster as claimed in claim 1 wherein said lower arm portions of said compensator clip are bent outwardly at the center thereof to form locating surfaces, said locating surfaces adapted to contact the inner surface of said side portions of said horn when said clip is positioned on said caster.

5. A swivel-type caster structure comprising a horn including a generally flattened top portion and spaced parallel side portions, a wheel positioned within said side portions for rotation therein, an aperture formed within said flattened top portion of said horn, a spindle positioned within said aperture and mounted for rotation therein, an annular member rigidly carried by said spindle beneath said aperture and adjacent said generally flattened upper surface of said horn, and a generally U-shaped, resilient, single element, wire compensator clip including a pair of generally horizontal upper arm portions and a pair of generally horizontal lower arm portions connected to the upper arm portions, said upper arm portions being shorter than said lower arm portions and joined together at their inner ends by a laterally extending crossarm portion, said crossarm portion contacting the upper surface of said top portion of said horn and forming the upper compressive contact surface of said clip, said horn having an indentation in the upper surface thereof for receiving said crossarm portion, each of said lower arm portions being bent outwardly at the center thereof so as to contact the inner surface of the side of said horn, said lower arm portions further including inwardly directed inner end portions, said end portions contacting said annular member to form lower compressive contact surfaces.

6. A swivel-type caster structure having a horn including a generally flattened top portion and spaced, parallel side portions, a wheel positioned within said side portions for rotation therein, an aperture formed within said flattened top portion, a spindle positioned within said aperture and mounted for rotation therein, a pair of annular members rigidly secured to said spindle, said annular members being positioned on either side of said flattened top portion of said horn and spaced therefrom by an upper and lower substantially continuous circular series of antifriction bearing members, a generally U-shaped resilient single-wire clip including a pair of upper and lower arm portions in horizontal spaced planes, said upper portions being joined at their inner ends by a laterally extending crossarm portion, said crossarm portion adapted to contact the upper surface of said top portion of said horn adjacent said spindle and to exert a downward compressive force on said horn, said lower arm portions terminating in end portions directed inwardly toward each other, said end portions adapted to contact the bottom surface of said lower annular member and to exert an upwardly directed compressive force on said annular member whereby said clip eliminates free play and shimmy within said caster bearing and reduces associated bearing noise.

7. In a swivel-type caster structure of the type in which a horn having a generally flat top portion and spaced generally parallel side portions carries a rotatable wheel within the side portions and in which a spindle having a lower annular member projects through the top portion of the horn and is mounted for rotation relative thereto, the combination with the horn and spindle of a compensator clip for eliminating shimmy between the horn and spindle comprising a resilient single element wire including a pair of widely spaced generally horizontal upper arm portions extending from one side of the top portion of the horn toward the spindle, a transverse connecting portion joining the ends of the arm portions nearest the spindle, a pair of generally horizontal lower arm portions each connected to the opposite end of a respective upper arm portion and extending generally toward the spindle, the free ends of the lower arm portions being bent sharply to extend generally inwardly toward the spindle axis and engaging the lower surface of the annular member at substantially diametrically opposed positions, the free ends of the lower arm portions and the transverse portion connecting the upper arm portions applying compressive forces to the lower surface of an annular member and the upper surface of the top portion of the horn, the free ends of the lower arm portions twisting under compression and tortionally deforming the compensator clip to inhibit relative movement of the horn and spindle.

8. In a swivel-type caster structure of the type in which a horn having a generally flat top portion and spaced side portions with narrow and wide sections carries a rotatable wheel within the side portions and in which a spindle having a lower annular surface projects through the top portion of the horn between said wide sections and is mounted for rotation relative thereto, the combination with the horn and spindle of a compensator clip for eliminating shimmy between the horn and spindle comprising a resilient single element wire including a pair of spaced generally horizontal upper arm portions extending from one side of the top portion of the horn toward the spindle, a transverse connecting portion joining the ends of the arms nearest the spindle, a pair of generally horizontal lower arm portions each connected to the opposite end of a respective upper arm portion, engaging a respective narrow section of the horn side portions and extending generally toward the spindle, each lower arm portion being bent at a central section thereof to engage a respective wide section of the horn side portions, the free ends of the lower arm portions being formed to extend generally toward the spindle axis and engaging the lower surface of the annular member at substantially diametrically opposed positions, the free ends of the lower arm portions and the transverse connecting portions applying compressive forces to the lower surface of an annular member and the upper surface of the top portion of the horn, the free ends of the lower arm portions twisting under compression and tortionally deforming the compensator clip to inhibit relative movement of the horn and spindle.

References Cited in the file of this patent

UNITED STATES PATENTS

| | | |
|---|---|---|
| 1,742,561 | Rumpf | Jan. 7, 1930 |
| 2,480,524 | Vallone et al. | Aug. 30, 1949 |
| 2,707,945 | Hughes | May 10, 1955 |

OTHER REFERENCES

Gibson (Handbook), "Mechanical Springs," page 92, copyright 1944, published by the William D. Gibson Company, 1800 Clybourn Ave., Chicago 14, Ill.